Patented Nov. 19, 1946

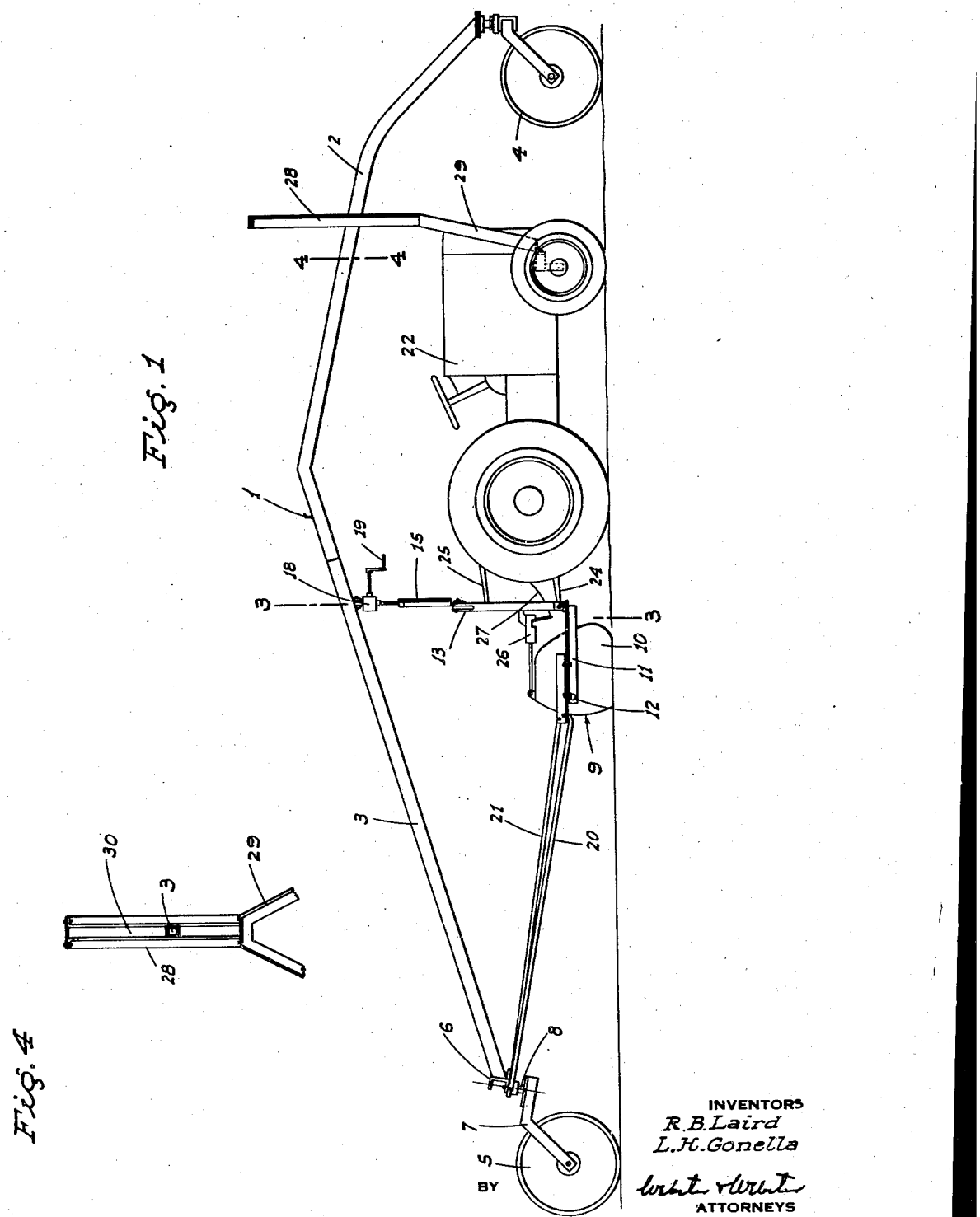

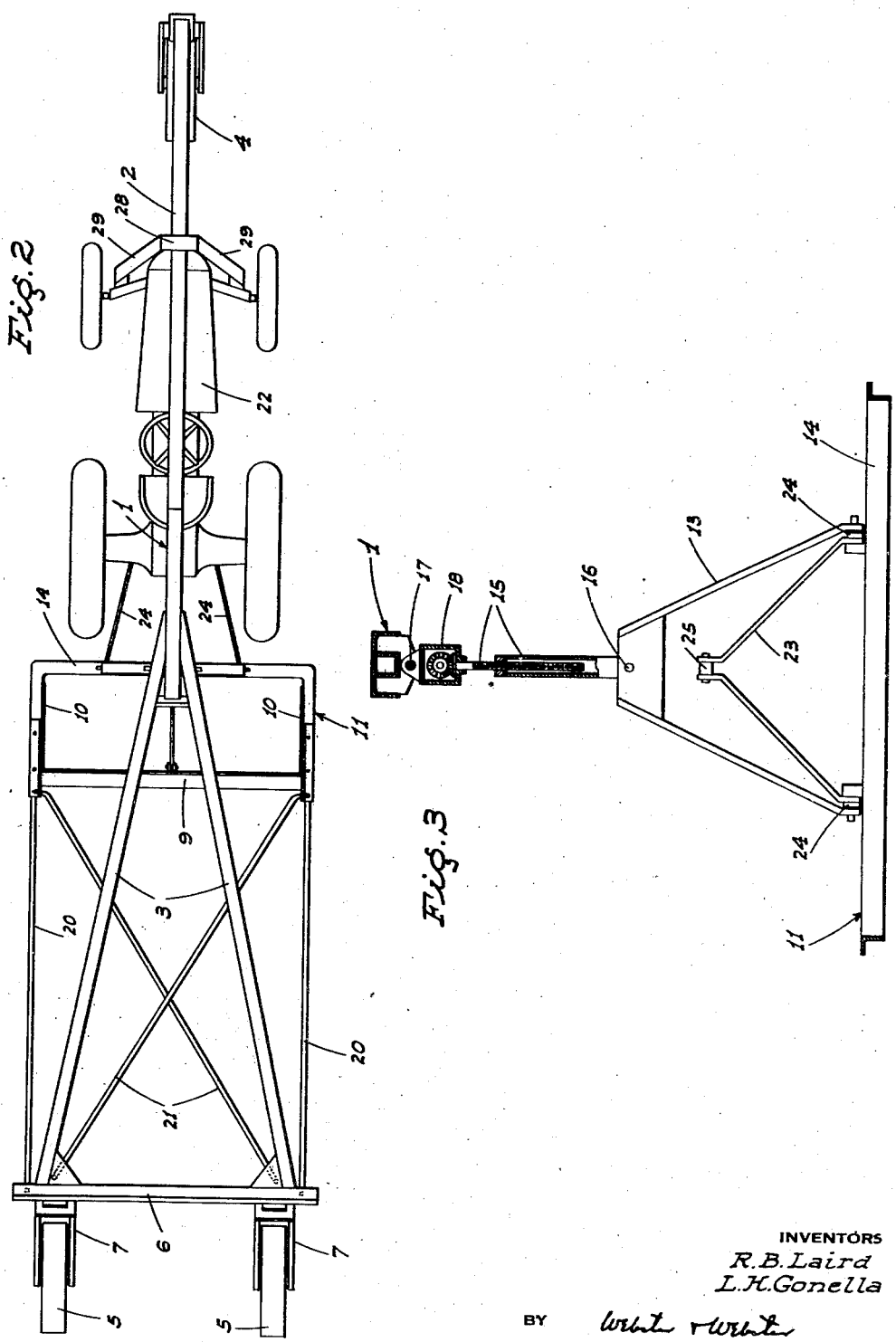

2,411,277

UNITED STATES PATENT OFFICE 2,411,277

TRACTOR-IMPLEMENT COMBINATION

Royal B. Laird and Louis H. Gonella, Merced, Calif.

Application March 6, 1945, Serial No. 581,240

11 Claims. (Cl. 37—180)

This invention is directed to, and it is an object to provide, an improved, tractor-advanced land leveler of the type known as a float or finish leveler which includes an extremely elongated frame supported at opposite ends by ground engaging wheels and having an earth scraper suspended from the frame intermediate its ends. Heretofore it has been the practice to couple such a leveler in draft relation behind the tractor, and as a result the tractor-leveler combination was of a length difficult to control and maneuver.

A further object of the present invention is to provide a land leveler, of the type described, arranged so that the tractor is disposed between the front wheel and scraper of the implement, and coupled in draft but floatable relation to said scraper. Thus, the tractor-implement combination is of no greater length than that of the implement, which is very advantageous.

Another object of the invention is to provide a tractor-implement combination, as in the preceding paragraph, in which the elongated main frame is arched and extends over the tractor in clearance relation; there being guide means between the tractor and main frame to maintain the latter longitudinally centrally alined with said tractor; said guide means functioning without restricting said relative floating of the tractor.

An additional object is to incorporate an adjusting mechanism in the implement whereby the elevation of the scraper can be manually and easily adjusted as to its depth of cut; said mechanism including a hand crank readily accessible to the operator of the tractor.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the tractor-implement combination.

Figure 2 is a plan view of said tractor-implement combination.

Figure 3 is a fragmentary transverse section on line 3—3 of Fig. 1.

Figure 4 is a fragmentary transverse section on line 4—4 of Fig. 1.

Referring now more particularly to the characters of reference on the drawings, the numeral 1 indicates generally an extremely elongated, arched frame which is of Y-shape in plan and includes a single forwardly projecting front beam 2 and a pair of divergent rear beams 3. The frame 1 is supported at the front end of the beam 2 by means of a caster wheel 4, while said frame is supported at the rear ends of the beams 3 by a transversely spaced pair of caster wheels 5 which connect with a cross beam 6 rigidly secured between the rear ends of said beams 3. The caster wheels 5 include normally forwardly projecting arms 7 which carry the spindles 8 about which said wheels are adapted to swivel, said spindles being disposed at right angles to the arms 7 but turnably secured to the cross beam 6 with a forward tilt, for the purpose which will hereinafter be described.

Substantially centrally between the front caster wheels 4 and rear caster wheels 5 the implement includes an earth scraper 9, here shown as being in the form of a bowl having side plates 10. The bowl 9 is straddled from the front by means of a rearwardly opening yoke 11, the arms of said yoke being pivotally connected, as at 12, to the adjacent side plate 10 of said bowl, and which yoke forms a sub-frame.

An upstanding A-frame 13 is pivotally connected at its lower end with the front cross member 14 of the yoke 11. A manually controlled screw jack unit 15 is disposed vertically above the A-frame 13 and pivotally connects between the upper end of the latter, as at 16, and a corresponding point on the arched main frame 1, as at 17. The screw jack unit 15 includes a gear box 18 actuated by means of a forwardly projecting hand crank 19. Operation of the crank 19 in one direction or the other will cause extension or retraction of the screw jack unit 15, with resultant lowering of the assembly of yoke 11 and scraper 9, or raising thereof.

Transversely spaced parallel tie rods 20 connect between the rear ends of the yoke 11 on opposite sides thereof, and corresponding points on the cross beam 6, while other diagonal and intersecting tie rods 21 connect between said rear ends of the yoke and opposite end portions of said cross beams 6. This assembly of tie rods stabilizes the bowl 9 in any position of vertical adjustment thereof.

A tractor, indicated generally at 22, is disposed beneath the elongated arched main frame 1 to the rear of caster wheel 4 and ahead of the assembly of yoke 11 and bowl 9. Another A-frame 23, of somewhat smaller size than the A-frame 13, is disposed within the latter and is secured in upstanding relation to the front cross member 14 of said yoke. The tractor includes a transversely spaced pair of vertically swingable draft links 24 which project rearwardly to pivotal connection with the front cross member 14 of the yoke at the lower ends of the A-frame 23.

Another vertically swingable draft link 25 projects rearwardly and centrally from the tractor above the draft links 24 and connects with the A-frame 23 at the top thereof. The links 24 and 25 provide a stable draft connection between the tractor and A-frame 23, but permit of vertical floating between said tractor and the bowl 9, as is very desirable in a land leveling implement of the type described.

When the scraper 9 is of a pivotally mounted bowl type, as here shown, it may be desirable at times to dump said bowl rather than using it solely as a drag scraper. To this end there is provided a latch mechanism 26 which extends between the bowl and the A-frame 23; said latch mechanism normally preventing rotation and dumping of the bowl, but being releasable by a pull cord 27 to permit of such dumping.

In order to maintain the frame 1 in longitudinal alinement with the tractor 22 a vertically slotted guide post 28 is mounted in rigid, upstanding relation on the front end of the tractor by means of a pair of downwardly diverging legs 29; the front beam 2 of the frame 1 extending through the slot 30 in guide post 28 in guided but vertically movable relation. It will be seen that with this arrangement, when the tractor is steered, such steering is likewise imparted to the main frame 1, which facilitates turning of the tractor-implement combination.

When such tractor-implement combination is in use the screw jack unit 15 is adjusted so as to position the bowl 9 for the desired depth of cut, and thereafter with advance of the implement said bowl produces a very effective leveling action. Any rise or fall of the tractor, due to its short wheel base, will not be imparted to the bowl for the reason that said tractor and bowl are arranged for relative vertical floating, as previously described.

In certain instances, as for example when making certain short turns, it is necessary to back the entire tractor-implement combination. When this is done the caster wheels 4 and 5 reverse, and the inclined mounting of the spindles 8 of the caster wheels 5 cause the rear end of the implement to raise to a certain extent when said caster wheels 5 swing to a reversed position. This in turn slightly elevates the bowl 9 from the ground, so that it does not impede easy backing of said tractor-implement combination.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful and upon which Letters Patent is desired:

1. A tractor-implement combination comprising an elongated frame supported above and for movement along the ground, a scraper, means suspending the scraper from the frame intermediate its ends, a tractor disposed between the front end of the frame and the scraper, draft means coupling the tractor and scraper in vertically floatable relation, and cooperating guide means between the tractor adjacent the front and the main frame arranged to maintain the tractor and frame in predetermined longitudinal alinement; the main frame including a longitudinally extending beam above the tractor, and said guide means including an upstanding, vertically slotted post through which said beam extends in relatively vertically movable relation.

2. A tractor-implement combination comprising an elongated frame supported above and for movement along the ground, a scraper, means suspending the scraper from the frame intermediate its ends, a tractor disposed between the front end of the frame and the scraper, and a draft coupling between the tractor and scraper; said frame being arched, and the tractor being positioned beneath the frame.

3. A tractor-implement combination comprising an elongated frame disposed above the ground, front and rear wheels supporting the frame at opposite ends, a scraper suspended from the frame intermediate its ends, a tractor disposed between the front wheel and the scraper, and a draft coupling between the tractor and scraper; said frame being arched, and the tractor being disposed in central longitudinal alinement beneath the frame.

4. A tractor-implement combination comprising an elongated overhead main frame, front and rear wheels supporting the frame at corresponding ends thereof, a scraper extending transversely below the frame intermediate the ends of the latter, a sub-frame on which said scraper is mounted, means suspending the sub-frame and attached scraper from the main frame, a tractor under the main frame directly ahead of the sub-frame, and draft means connecting between the tractor and said sub-frame.

5. A tractor-implement combination comprising an elongated overhead main frame, front and rear wheels supporting the frame at corresponding ends thereof, a scraper extending transversely below the frame intermediate the ends of the latter, a sub-frame on which said scraper is mounted, means suspending the sub-frame and attached scraper from the main frame, and draft means connecting between the tractor and said sub-frame; said sub-frame including a rearwardly opening yoke between the legs of which the scraper is mounted.

6. A tractor-implement combination comprising an elongated overhead main frame, front and rear wheels supporting the frame at corresponding ends thereof, a scraper extending transversely below the frame intermediate the ends of the latter, a sub-frame on which said scraper is mounted, means suspending the sub-frame and attached scraper from the main frame, a tractor under the main frame directly ahead of the sub-frame, and vertically swingable draft means connecting the tractor and said sub-frame in vertically floatable relation.

7. A tractor-implement combination comprising an elongated overhead main frame, front and rear wheels supporting the frame at corresponding ends thereof, a scraper extending transversely below the frame intermediate the ends of the latter, a sub-frame on which said scraper is mounted, means suspending the sub-frame and attached scraper from the main frame, a tractor under the main frame directly ahead of the sub-frame, and draft means connecting the tractor and sub-frame in vertically floatable relation; said suspending means being adjustable to vary the working depth of the scraper.

8. A tractor-implement combination comprising an elongated, arched main frame, front and rear wheels supporting the main frame at corresponding ends thereof, a scraper extending transversely beneath the main frame intermediate its ends, a sub-frame on which the scraper is mounted, said sub-frame including an upstanding A frame, a screw jack suspending the sub-frame from the main frame, transversely spaced tie rods extending rearwardly from the sub-frame, a cross member on the rear of the main frame to which said tie rods connect, a tractor below the main frame directly ahead of the sub-frame, draft means connecting the tractor and sub-frame in vertically floatable relation, and guide means between the tractor and main frame arranged to maintain the same in longitudinal alinement.

9. A tractor-implement combination comprising an elongated, arched main frame, front and rear wheels supporting the main frame at corresponding ends thereof, a scraper extending transversely beneath the main frame intermediate its ends, a sub-frame on which the scraper is mounted, said sub-frame including an upstanding A frame, a screw jack suspending the sub-frame from the main frame, transversely spaced tie rods extending rearwardly from the sub-frame, a cross member on the rear of the main frame to which said tie rods connect, a tractor below the main frame directly ahead of the sub-frame, draft means connecting the tractor and sub-frame in vertically floatable relation, and guide means between the tractor and main frame arranged to maintain the same in longitudinal alinement; said guide means comprising a vertically slotted post mounted on and upstanding from the tractor at the front, and the main frame having a longitudinal beam extending through the slot in vertically movable relation.

10. A tractor-implement combination comprising an elongated frame disposed above the ground, front and rear wheels supporting the frame at opposite ends, a scraper suspended from the frame intermediate its ends, a tractor disposed between the front wheel and the scraper, and a draft coupling between the tractor and scraper; the rear wheels being transversely spaced caster type wheels having normally forwardly projecting spindle supporting arms, the spindles being turnably secured to the frame at a forward tilt.

11. A tractor implement combination comprising an arching frame, wheels supporting the frame at each end thereof, an earth working implement suspended from the frame at a point intermediate the ends of the frame, means to adjust the implement vertically, tie rods flexibly connected to the implement and to the rear end of the frame, and a tractor disposed beneath the frame forwardly of the implement and connected in draft relation to such implement.

ROYAL B. LAIRD.
LOUIS H. GONELLA.